United States Patent
Schnell et al.

(10) Patent No.: US 10,060,827 B2
(45) Date of Patent: Aug. 28, 2018

(54) FLEET MANAGEMENT SYSTEM

(71) Applicant: Kohler Co., Kohler, WI (US)

(72) Inventors: William Schnell, Kiel, WI (US);
Martin Radue, Kohler, WI (US);
Travis Andren, Philadelphia, PA (US);
Todd Baumann, Howards Grove, WI (US); Mark Johansen, Kohler, WI (US)

(73) Assignee: Kohler Co., Kohler, WI (US)

( * ) Notice: Subject to any disclaimer, the term of this patent is extended or adjusted under 35 U.S.C. 154(b) by 782 days.

(21) Appl. No.: 14/586,323

(22) Filed: Dec. 30, 2014

(65) Prior Publication Data

US 2015/0204758 A1    Jul. 23, 2015

Related U.S. Application Data

(60) Provisional application No. 61/928,759, filed on Jan. 17, 2014.

(51) Int. Cl.
*G01M 15/05* (2006.01)
*G06Q 10/08* (2012.01)
*G06Q 10/00* (2012.01)
*G07C 5/00* (2006.01)
*G06Q 10/06* (2012.01)
*A01B 67/00* (2006.01)

(52) U.S. Cl.
CPC ........ *G01M 15/05* (2013.01); *G06Q 10/0631* (2013.01); *G06Q 10/0833* (2013.01); *G06Q 10/20* (2013.01); *G07C 5/008* (2013.01); *A01B 67/00* (2013.01); *G07C 2205/02* (2013.01)

(58) Field of Classification Search
CPC .............................. G06Q 10/20; G06Q 10/30
USPC ......................................... 701/31.4
See application file for complete search history.

(56) References Cited

U.S. PATENT DOCUMENTS

| 4,999,781 | A | * | 3/1991 | Holl ............ F02D 41/0052 123/674 |
| 5,786,998 | A | | 7/1998 | Neeson et al. |
| 5,922,040 | A | | 7/1999 | Prabhakaran |
| 5,995,898 | A | | 11/1999 | Tuttle |

(Continued)

FOREIGN PATENT DOCUMENTS

| CN | 102436230 A | 5/2012 |
| CN | 103106561 A | 5/2013 |

(Continued)

OTHER PUBLICATIONS

International Search Report and Written Opinion, from PCT/US2014/072775, dated Apr. 10, 2015, WO.

(Continued)

*Primary Examiner* — Daniel S Larkin
*Assistant Examiner* — Anthony W Megna Fuentes
(74) *Attorney, Agent, or Firm* — Lempia Summerfield Katz LLC

(57) ABSTRACT

In one example, fleet devices are monitored. The fleet devices include engines. A controller, such as an engine controller or centralized controller, receives sensor data indicative of a load on the engine from one or more of the fleet devices. The controller analyzes the load from the sensor data to identify a management function. The controller generates a message including the management function.

19 Claims, 9 Drawing Sheets

(56) References Cited

U.S. PATENT DOCUMENTS

| | | |
|---|---|---|
| 5,999,876 A | 12/1999 | Irons et al. |
| 6,025,774 A | 2/2000 | Forbes |
| 6,064,299 A | 5/2000 | Lesesky et al. |
| 6,249,217 B1 | 6/2001 | Forbes |
| 6,263,265 B1 | 7/2001 | Fera |
| 6,301,531 B1 | 10/2001 | Pierro et al. |
| 6,330,499 B1 | 12/2001 | Chou et al. |
| 6,338,013 B1 | 1/2002 | Ruffner |
| 6,389,337 B1 | 5/2002 | Kolls |
| 6,411,203 B1 | 6/2002 | Lesesky et al. |
| 6,553,290 B1 | 4/2003 | Pillar |
| 6,556,905 B1 | 4/2003 | Mittelsteadt et al. |
| 6,594,557 B1 | 7/2003 | Stefan et al. |
| 6,608,554 B2 | 8/2003 | Lesesky et al. |
| 6,611,755 B1 | 8/2003 | Coffee et al. |
| 6,636,790 B1 | 10/2003 | Lightner et al. |
| 6,647,356 B2 | 11/2003 | Pierro et al. |
| 6,653,821 B2 | 11/2003 | Kern et al. |
| 6,677,854 B2 | 1/2004 | Dix |
| 6,732,031 B1 | 5/2004 | Lightner et al. |
| 6,732,032 B1 | 5/2004 | Banet et al. |
| 6,744,352 B2 | 6/2004 | Lesesky et al. |
| 6,765,497 B2 | 7/2004 | Ablay et al. |
| 6,799,814 B2 | 10/2004 | Lesesky et al. |
| 6,836,708 B2 | 12/2004 | Tripathi |
| 6,850,869 B2 | 2/2005 | Pierro et al. |
| 6,856,820 B1 | 2/2005 | Kolls |
| 6,882,917 B2 | 4/2005 | Pillar et al. |
| 6,892,131 B2 | 5/2005 | Coffee et al. |
| 6,957,133 B1 | 10/2005 | Hunt et al. |
| 6,993,421 B2 | 1/2006 | Pillar et al. |
| 7,015,800 B2 | 3/2006 | Lesesky et al. |
| 7,059,689 B2 | 6/2006 | Lesesky et al. |
| 7,076,348 B2 | 7/2006 | Bucher et al. |
| 7,123,164 B2 | 10/2006 | Zoladek et al. |
| 7,127,716 B2 | 10/2006 | Jin et al. |
| 7,142,844 B2 | 11/2006 | Obradovich et al. |
| 7,171,300 B1 | 1/2007 | Anderson |
| 7,184,866 B2 | 2/2007 | Squires et al. |
| 7,228,211 B1 | 6/2007 | Lowrey et al. |
| 7,257,426 B1 | 8/2007 | Witkowski et al. |
| 7,319,848 B2 | 1/2008 | Obradovich et al. |
| 7,333,922 B2 | 2/2008 | Cannon |
| 7,449,993 B2 | 11/2008 | Lesesky et al. |
| 7,457,693 B2 | 11/2008 | Olsen et al. |
| 7,489,993 B2 | 2/2009 | Coffee et al. |
| 7,497,529 B2 | 3/2009 | Lesesky et al. |
| 7,499,993 B2 | 3/2009 | Sea |
| 7,502,672 B1 | 3/2009 | Kolls |
| 7,551,063 B2 | 6/2009 | Inbarajan |
| 7,571,036 B2 | 8/2009 | Olsen et al. |
| 7,587,264 B2 | 9/2009 | Furuno et al. |
| 7,660,652 B2 | 2/2010 | Smith et al. |
| 7,689,334 B2 | 3/2010 | Massen et al. |
| 7,756,616 B2 | 7/2010 | Helm |
| 7,786,895 B2 | 8/2010 | Zoladek et al. |
| 7,817,019 B2 | 10/2010 | Lesesky |
| 7,899,610 B2 | 3/2011 | McClellan |
| 7,904,219 B1 | 3/2011 | Lowrey et al. |
| 7,967,396 B2 | 6/2011 | Lesesky et al. |
| 8,027,761 B1 | 9/2011 | Nelson |
| 8,055,403 B2 | 11/2011 | Lowrey et al. |
| 8,099,207 B2 | 1/2012 | Fletcher et al. |
| 8,139,820 B2 | 3/2012 | Plante et al. |
| 8,155,817 B2 | 4/2012 | Oesterling |
| 8,345,047 B2 | 1/2013 | Sanchez |
| 8,416,067 B2 | 4/2013 | Davidson et al. |
| 8,473,148 B2 | 6/2013 | Nielsen et al. |
| 8,509,812 B2 | 8/2013 | Fong et al. |
| 8,560,164 B2 | 10/2013 | Nielsen et al. |
| 8,619,141 B2 | 12/2013 | Anderson |
| 8,626,568 B2 | 1/2014 | Warkentin et al. |
| 8,680,976 B2 | 3/2014 | Lesesky |
| 8,736,438 B1 | 5/2014 | Vasquez et al. |
| 8,833,861 B2 | 9/2014 | Donnelli et al. |
| 8,868,237 B2 | 10/2014 | Sandin et al. |
| 8,868,288 B2 | 10/2014 | Plante et al. |
| 8,947,202 B2 | 2/2015 | Tucker et al. |
| 8,989,959 B2 | 3/2015 | Plante et al. |
| 9,041,556 B2 | 5/2015 | Tucker et al. |
| 9,167,418 B1 | 10/2015 | Tuluca |
| 9,194,091 B2 | 11/2015 | Moon, Jr. et al. |
| 9,201,842 B2 | 12/2015 | Plante |
| 9,246,288 B2 | 1/2016 | Jones |
| 2002/0061758 A1 | 5/2002 | Zarlengo et al. |
| 2003/0023367 A1* | 1/2003 | Avery, Jr. ............... F01N 3/023 701/110 |
| 2003/0236723 A1 | 12/2003 | Angott |
| 2004/0002794 A1 | 1/2004 | Pillar et al. |
| 2004/0093264 A1 | 5/2004 | Shimizu |
| 2005/0267713 A1 | 12/2005 | Horkavi et al. |
| 2006/0101927 A1 | 5/2006 | Blakeley, III |
| 2006/0123053 A1 | 6/2006 | Scannell, Jr. |
| 2006/0154642 A1 | 7/2006 | Scannell, Jr. |
| 2006/0277884 A1 | 12/2006 | Bucher |
| 2007/0088812 A1 | 4/2007 | Clark |
| 2007/0179799 A1 | 8/2007 | Laghrari |
| 2007/0213897 A1 | 9/2007 | Estes et al. |
| 2007/0276572 A1 | 11/2007 | Siemer et al. |
| 2007/0277403 A1 | 12/2007 | Summer |
| 2008/0039995 A1 | 2/2008 | Reeser |
| 2008/0073090 A1 | 3/2008 | Harris |
| 2008/0147267 A1 | 6/2008 | Plante et al. |
| 2008/0179139 A1 | 7/2008 | Montgomery |
| 2008/0234919 A1 | 9/2008 | Ritter et al. |
| 2009/0112394 A1 | 4/2009 | Lepejian et al. |
| 2009/0157255 A1 | 6/2009 | Plante |
| 2009/0191034 A1 | 7/2009 | McGhee et al. |
| 2009/0254240 A1 | 10/2009 | Olsen, III et al. |
| 2011/0060496 A1 | 3/2011 | Nielsen et al. |
| 2011/0231055 A1 | 9/2011 | Knight et al. |
| 2011/0251807 A1 | 10/2011 | Rada et al. |
| 2011/0307141 A1 | 12/2011 | Westerlage et al. |
| 2012/0041635 A1 | 2/2012 | Johnson et al. |
| 2012/0101679 A1 | 4/2012 | Anderson et al. |
| 2012/0143642 A1 | 6/2012 | O'Neil |
| 2012/0226393 A1 | 9/2012 | Lesesky |
| 2012/0278479 A1 | 11/2012 | Miller et al. |
| 2012/0328370 A1 | 12/2012 | Gustafsson et al. |
| 2013/0006715 A1 | 1/2013 | Warkentin et al. |
| 2013/0041526 A1 | 2/2013 | Ouyang |
| 2013/0112673 A1 | 5/2013 | Petrilla et al. |
| 2013/0192183 A1 | 8/2013 | Choi et al. |
| 2013/0343906 A1 | 12/2013 | Funke et al. |
| 2014/0151079 A1 | 6/2014 | Furui et al. |
| 2014/0262560 A1 | 9/2014 | Dwyer |
| 2014/0265555 A1 | 9/2014 | Hall et al. |
| 2014/0266659 A1 | 9/2014 | Dwyer |
| 2014/0266664 A1 | 9/2014 | Dwyer |
| 2014/0277967 A1 | 9/2014 | Sprock et al. |
| 2014/0284022 A1 | 9/2014 | Maxbauer et al. |
| 2014/0371979 A1 | 12/2014 | Drew et al. |
| 2015/0006025 A1 | 1/2015 | Rhoades et al. |
| 2015/0007541 A1 | 1/2015 | Albinger et al. |
| 2015/0019280 A1 | 1/2015 | Mejegard et al. |
| 2015/0021113 A1 | 1/2015 | Lefevbre et al. |
| 2015/0025755 A1 | 1/2015 | Willgert et al. |
| 2015/0039269 A1 | 2/2015 | Mejegard et al. |
| 2015/0058062 A1 | 2/2015 | Mejegard et al. |
| 2015/0081359 A1 | 3/2015 | Mejegard et al. |
| 2015/0102121 A1 | 4/2015 | Dey et al. |
| 2015/0116132 A1 | 4/2015 | Nohra et al. |
| 2015/0128547 A1 | 5/2015 | Einecke et al. |
| 2015/0174766 A1 | 6/2015 | Jagenstedt et al. |
| 2015/0201555 A1 | 7/2015 | Willgert |
| 2015/0220086 A1 | 8/2015 | Willgert |
| 2015/0240773 A1 | 8/2015 | Koenen et al. |
| 2015/0316913 A1 | 11/2015 | Rickey et al. |
| 2015/0323974 A1 | 11/2015 | Shuster et al. |
| 2015/0366124 A1 | 12/2015 | Kremmer et al. |

(56) References Cited

U.S. PATENT DOCUMENTS

2016/0007525 A1 1/2016 Drew et al.
2016/0014954 A1 1/2016 Dwyer

FOREIGN PATENT DOCUMENTS

| WO | WO2013134709 A1 | 9/2013 |
| WO | WO2013134718 A1 | 9/2013 |

OTHER PUBLICATIONS

Cub Cadet's New XT Enduro Series® Lawn TractorsHonored for First-of-Its-Kind Bluetooth App, https://www.pmewswire.com/news-releases/cub-cadets-new-xt-enduro-series-lawn-tractors, pp. 1-3, Jan. 7, 2015.

Chinese Office Action for related Chinese Application No. 201480071688.0 dated Apr. 28, 2017.

* cited by examiner

FLEET MANAGEMENT SYSTEM

CROSS REFERENCE TO OTHER APPLICATIONS

This application claims the benefit of U.S. Provisional Application Ser. No. 61/928,759, filed Jan. 17, 2014, which is hereby incorporated by reference in its entirety.

FIELD

This application relates to the management of fleet devices based on sensor data. In one example, the sensor data describes a load on an engine.

BACKGROUND

A group of machines may be referred to as a fleet. Examples in which fleets of machines are deployed may be in agriculture, landscaping, gardening and timber harvesting. The group of machines may include small internal combustion engines. The fleet may be managed by a single entity. For example, the machines may be dispatched or assigned to job locations. The single entity may rely on workers to manually enter data in logs in order to maintain the machines. It may be difficult to rely on the system to track working hours, maintenance, and other management functions of the machines.

BRIEF DESCRIPTION OF THE DRAWINGS

Exemplary embodiments are described herein with reference to the following drawings.

DETAILED DESCRIPTION

A group of machines may be referred to as a fleet. Each of the machines in the fleet may include an engine, one or more sensors, and one or more communication modules. Some example machines, such as chainsaws, lawn mowers, wood chippers, stump grinders, concrete trowels, mini excavators, concrete saws, portable saw mills, weed trimmers, all-terrain vehicles, wood splitters, pressure washers, garden tillers, tractors, plows, snow blowers, welding equipment, generators, and other devices, may include small internal combustion engines. The fleet may include different or other types of machines and/or different engines. In some instances, the fleet is a unitary fleet of a single device.

The engine and/or one or more sensors may identify, measure, and/or otherwise detect various information and data about the engine or machine. The machines may transmit information, such as through or using the communication module, to one or more central devices. The information may be analyzed by a central device, or management device, in order to facilitate maintenance, audits, coordination of the machines, theft prevention, or other management processes. The fleet may include different types of devices.

Figure 1:
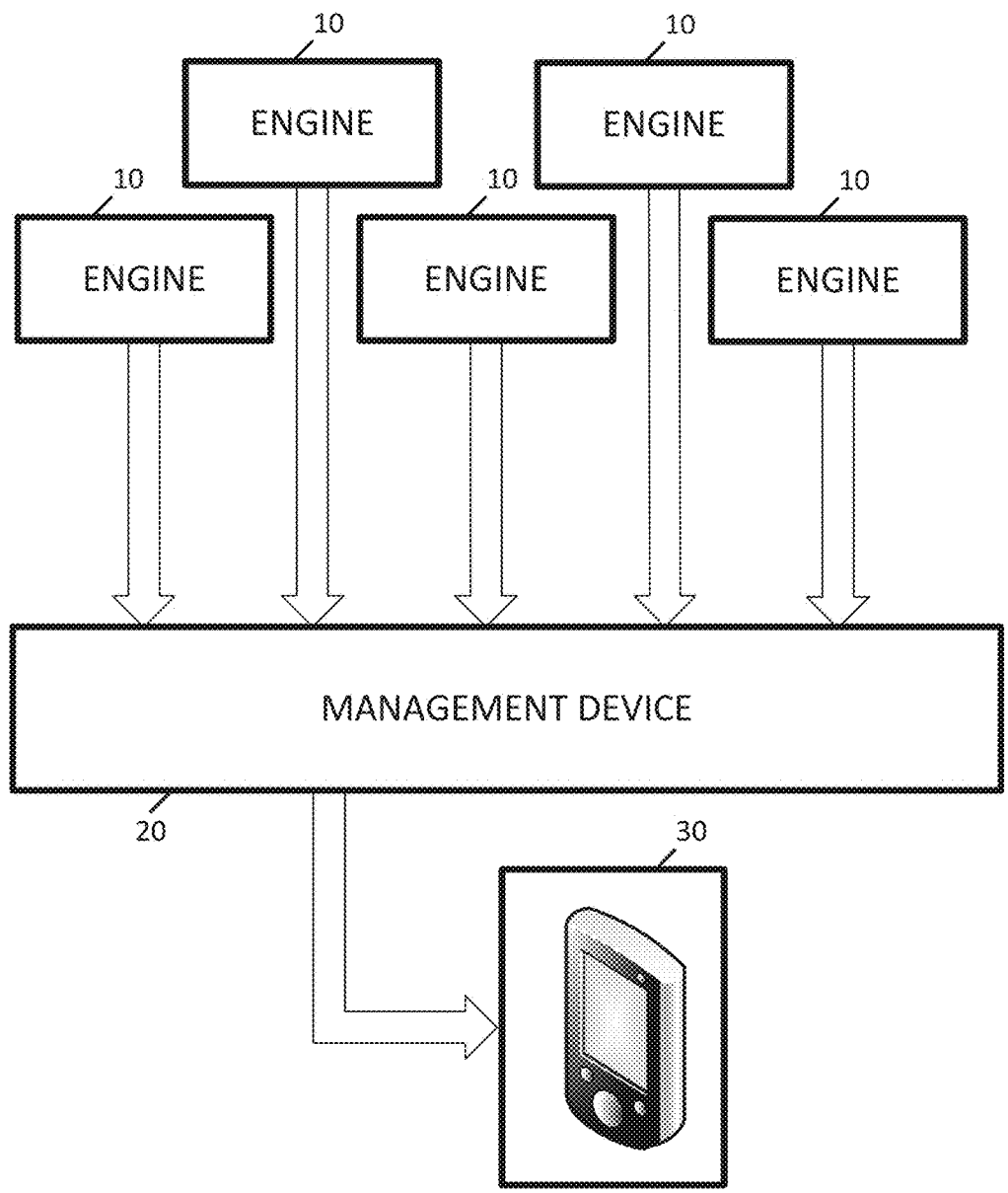
FIG. 1 illustrates an example fleet management system.

FIG. 1 illustrates an example fleet management system. The fleet management system may include one or more engines 10, a management device 20, and an access device 30. One or more of the engines 10 may be included with a machine driven by the engine, such as a lawn mower. The engines 10 and the access device 30 may communicate with the management device 20 through one or more wired or wireless networks. Additional, different, or fewer devices may be included in the fleet management system.

The engines 10 may collect data. For example, the engine 10 or a sensor in communication with the engine 10 may identify, measure, and/or otherwise detect information or values for various parameters of the engine 10 or machine driven by the engine 10. As an example, the engine 10 may include an engine control unit (ECU) or engine control module (ECM) which may communicate with temperature, pressure, or speed sensors to gather information about the operating parameters of the engine such as a load on the engine. Many other examples are possible.

The engines 10 may include logic, circuitry, or a controller to aggregate, filter, tag, and package the data. In one example, the controller includes a communication module that filters and packages the data. In one example, the controller includes logic for averaging the data over time or filtering to remove noisy data or outlier values. As another example, the communication module, controller, or other logic may insert an identifier into, or otherwise tag, the data. The identifier may include one or more of a date stamp, a time stamp, a machine identification value, and a fleet identification value. As another example, the communication module, controller, or other logic may insert an ambient condition value into, or otherwise tag, the data. The ambient condition value may include the altitude, temperature, pressure, or orientation of the machine when the data was collected. Many other examples of filtering, tagging, and packaging are possible. Alternatively, raw data (e.g., without filtering, tagging, and/or packaging) may be sent by the engine 10 to the management device 20. In these systems, the management device 20 may perform any of the aggregating, filtering, tagging, or packaging of the data, and/or may analyze the data. For example, the management device 20 may receive sensor data for an engine from one or more fleet devices.

One or more engines 10 may store the data, such as in memory accessible to or part of the ECU or ECM. In addition or alternatively, the engines 10 may transmit the data, including any attached identifier and/or the ambient condition value, to the management device 20. Alternatively, the management device 20 may probe the engines 10 or gather the information directly from the engines 10. For example, the engines 10 may include or be in communication with one or more communication modules that may transmit the data to the management device 20.

The management device 20 may analyze the sensor data to identify a management function and generate a message including the management function, which is communicated to the engines 10. The communication between the engines 10 and the management device 20 may occur continuously, regularly, intermittently, at set intervals, when triggered, randomly, or at various other intervals. For example, the communication may be through a cellular connection with a cellular telephone network. The cellular telephone network may utilize one or more of the analog advanced mobile phone system (AMPS), the global system for mobile communication (GSM), third generation partnership project (3GPP), code division multiple access (CDMA), personal handy-phone system (PHS), 4G or long term evolution (LTE) standards, and future standards.

As another example, the communication between the engines 10 and the management device 20 may be intermittent. For example, the controller of the engine 10 may upload data and predefined times, when connected to a communication device, or when in range of a wireless network. The wireless network may utilize radio frequency communication using the Bluetooth protocol, the IEEE 802.11 family of protocols, or another protocol. Many other examples of communication interactions are possible.

The management device 20 may be or include one or more servers or other memory in which the management device 20 may store the data. The management device 20 may additionally analyze the data. The analysis may involve identification of a problem with the engine or machine, calculation of a performance metric associated with the engine or machine, or detection of routine maintenance for the engine or machine.

In some systems, the engine 10 may additionally or alternatively perform one or more of the above-described analyses, identifications, or calculations with the information. The engine 10 may communicate the analysis results to the management device 20. Other variations are possible.

The management device 20 may communicate with the access device 30. The access device 30 may be one or more consumer devices, such as a cellular or smart phone, tablet, computer or processor, or various other devices. The access device 30 may communicate with the management device 20 through a wireless network, Internet, or a cellular telephone network as described above. The communication may be email, text message, or another communication.

The access device 30 may display information from the management device 20, or one or more messages, to the user of the access device 30. For example, the access device 30 may display information about the performance of the engine 10 or the machine to the user, such as a performance report. As another example, the access device 30 may display a message indicating that a repair or service is necessary. The display may include a chart or graph that describes the states of multiple engines 10 or machines incorporating engines 10 in the fleet. Many other variations are possible.

Figure 2:
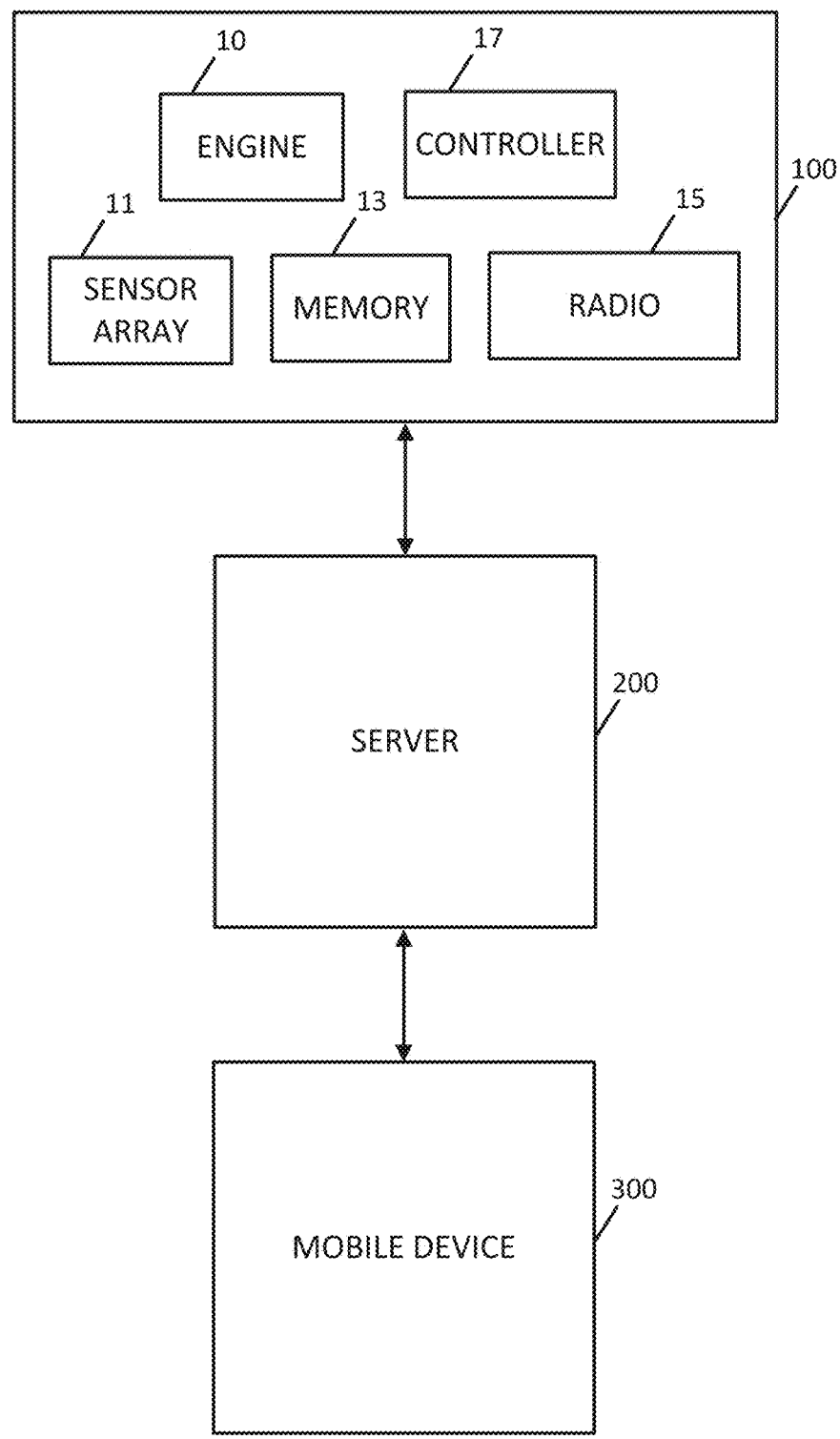
FIG. 2 illustrates another example fleet management system.

FIG. 2 illustrates another example fleet management system. The fleet management system may include one or more machines 100, servers 200, and mobile devices 300. In some systems, the server 200 may be a management device 20, and the mobile device 300 may be an access device 30. Additional, different, or fewer components may be included in the fleet management system.

The machine 100 may include an engine 10, a sensor array 11, a memory 13, a radio 15, and a controller 17. The controller 17 may be an engine control unit (ECU) or a combination of an ECU and another controller.

The sensor array 11 may include one or more types of sensors. Example types of sensors include gas sensors, motion sensors, temperature sensors, pressure sensors, and internal engine sensors. Example gas sensors may include one or more of oxygen sensor, carbon dioxide sensor, carbon monoxide, or an emission sensor. An example emission sensor may detect exhaust hydrocarbon plus oxides of nitrogen (HC+NOx).

Example motion sensors may include any combination of a position sensor, an accelerometer, and a rotation sensor. Example positioning sensors may include a global positioning system (GPS) for providing the location of the machine 100. An example accelerometer may be single-axis or multi-axis. An example rotation sensor may be tilt sensor, a gyrometer, a compass, or a magnetic sensor. Example temperature and pressure sensors may measure a temperature or pressure of a component of the machine or the temperature of the air entering the engine. Any combination of the sensors may be included individual or integrated into an inertial measurement unit (IMU) including any combination of accelerometers, gyroscopes, and magnetometers. Other sensors may be used.

The internal engine sensors may include a manifold absolute pressure (MAP) sensor, air to fuel ratio sensors, injection time sensors, temperature plus manifold absolute pressure sensor (TMAP), engine temperature sensors, air intake temperature sensors, oil temperature sensors, oil pressure sensors, battery sensor, ignition sensor, a clock, oil quality sensor, oil level sensor, crankshaft position, choke position sensors and throttle position sensor.

The engine 10 may include a manifold, one or more cylinders, a fuel supply, a speed governor, a cooling system, an exhaust system, a lubrication system, and a starter. The manifold absolute pressure (MAP), air intake temperature, and temperature+manifold absolute pressure (TMAP) sensors may be mounted in the manifold or throttle valve. The engine temperature sensors may be located at various locations in the engine 10 including the cylinders, manifold, a cooling system, and exhaust. The oil quality sensor, oil temperature sensor and/or the oil pressure sensor may be mounted in the lubrication system. The battery sensor may be electrically connected to the battery or elsewhere in the electrical system. The throttle position sensor may be on a throttle valve. Additional, different, or fewer components may be included.

In some example systems, the controller 17 analyzes the sensor data, such as by performing any of the analysis described below and elsewhere herein. In some of these systems, the radio 15 may send the results to the server 200. In other examples, the raw data from the sensor array 11 may be sent by the radio 15 to the server 200, and the server 200 may perform any of the analysis described below and elsewhere herein. The sensor data may be encoded using the Keyword Protocol 2000 (KWP2000), CAN bus, or one board diagnostic (OBD II), or in various other ways or with various other protocols.

Notifications or reports may be sent from the server 200 to the mobile device 300. The notifications or reports may describe management functions. For example, a notification may be sent to a user when the machine 100 or server 200 determines that maintenance or service may be due on the machine 100 or a component thereof. In other examples, the mobile devices 300 may access data or analysis from the server 200, such as through one or more web sites, applications (or apps), or other user interface modules. For example, a user may access information about a fleet of machines 100 stored on the server 200 through a secure log-in process. Alternatively, the notifications may be sent by email, text message, or through a mobile application. Many other variations are possible.

The following examples include example implementations of engine sensor data collection and analysis by the fleet management system. While the following examples may refer to server 200 or mobile device 300, it should be understand that the examples may be performed by any management device 20, access device 30, or other computing device.

The fleet management system may provide maintenance reminders in order to provide customized maintenance intervals and extend the life of the engine. The maintenance reminders may be based on time. For example, the server 200 may compare a time recorded at or by the engine 10 to a predetermine maintenance interval. The time may be tracked or recorded using a clock at the engine 10 or another location.

For example, an engine 10 may track the run time of the engine 10, or a run time of the engine 10 since a reset condition (such as since a past maintenance action). A timer or clock may start when the engine 10 is running and may stop when the engine 10 stops. The start and stop of the timer or clock may be based on an ignition sensor or an ignition signal from an ignition. Additionally or alternatively, the start and stop of the timer or clock may be based on another parameter that indicates the engine is running, such as based on a start or stop of a crankshaft turning, when fuel is flowing to an injection system or from a fuel tank, etc. In another example, the engine 10 or another component may track a number of starts of the engine 10, which may be used by the engine 10 or the server 200 to determine a maintenance reminder or alert. In one example, the start and stop of the timer may depend on a load on the engine. For example, when the load on the engine exceeds a threshold, the timer is started, and when the load on the engine falls below the threshold, the timer is stopped or paused.

The server 200 may generate a message or report for display at the mobile device 300 that reminds the user to perform engine maintenance based on the engine run time or number of starts. Example types of maintenance reminders that may be identified, calculated, and/or sent may include an oil change, spark plug replacement, air filter change, oil filter change, fuel filter change, air cleaner change, shroud cleaning, and oil cooler cleaning. In some examples, the message may describe a status for multiple engines in the fleet. For example, the message may state that Engine A is in need of service now and Engine C will be in need of service in the week. To increase maintenance efficiency Engine A and Engine C may be serviced immediately. The messages or reports may be sent to the user, such as periodically, regularly, at intervals, when a status changes (such as when a component requires maintenance or will require maintenance in the future), or at other intervals. In other examples, a user may access the messages or reports at their own convenience, such as through a website or mobile application (app). The user may customize the timing and type of the messages. Other variations are possible.

The fleet management system may provide automatic customization of the maintenance intervals for individual engines. The engine 10 or the server 200 may base maintenance reminders on other parameters of the engine, such as an engine temperature. For example, the server 200 may receive temperature data from the sensor array 11. The temperature data may describe the oil temperature or another detected temperature at the engine 10. When the engine 10 runs at higher than expected temperatures, the maintenance intervals may be shortened. When the engine 10 runs at lower than expected temperatures, the maintenance intervals may be extended. Example maintenance intervals that may be changed as a function of engine temperature may include oil changes. Other examples are possible.

The fleet management system may detect an ideal maintenance interval for individual engines 10 and/or components of the engines 10. The maintenance intervals may be set based on the actual or calculated fuel usage of the engine 10. The usage of the engine may be determined from data received at the ECU of the engine 10. For example, the engine 10 may track the time that a fuel injector for a cylinder is open. The controller 17 (e.g., ECU) may calculate the injection time and generate a signal for the injectors that defines the amount of time the injectors remain open and allow fuel to flow. Using this information, the controller 17 or the server 200 may calculate an amount of fuel actually injected into or used by that cylinder. The engine 10 transmits injection time data of the engine 10, and may either perform the fuel usage calculations or may send the data to the server 200 for calculation. The injection time data may be aggregated to precisely describe the amount of fuel supplied to the cylinders of the engine 10. The injection time data may include an on time and an off time for each cylinder of the engine 10. The injection time data may be based on the actuation of a solenoid in the injector.

The engine 10 may include one, two, three, four, or any number of cylinders. The injection time data may be different for different cylinders. For any given load and rotational speed of the engine 10, the injection time may vary as a function of altitude, temperature, or ambient pressure. The controller 17 may store injection times in the memory 13 and report injection time data to the server 200 periodically (e.g., every minute, every hour, or every day). The server 200 or the controller 17 may calculate fuel usage base on the injection time data. For example, each fuel injector may be rated based on volume. Example ratings may include one liter per second or another volume.

The controller 17 may calculate a maintenance interval or other management function based on the injection time data. Example maintenance that may be set as a function of the injection time includes fuel filter replacement. The fuel filter may be rated by volume. For example, a specific fuel filter may be designed for 100,000 liters of fuel or another value. The memory 15 or server 200 may include a lookup table that defines maintenance intervals by associating engine models, filter models, or oil types with expected fuel volume lifetimes. Alternatively, the lookup table may define maintenance intervals by associating usage times with engine models, filter models, or oil types.

The maintenance intervals may be set based on an oil quality of the engine 10. Oil quality data may be generated by the oil quality sensor. The oil quality data may be indicative of contaminants or the viscosity of the oil. The controller 17 or the server 200 may compare the oil quality to one or more threshold values. When the quality of the oil falls below the threshold, a message sent to the mobile device 200 may remind the user to change the oil. Other variations of sensors or calculations may be possible.

The maintenance intervals may be set based on an oil level of the engine 10. Oil level data may be generated by the oil level sensor (e.g., float sensor). The oil level data may be indicative of the volume of the oil in the lubrication system. The controller 17 or the server 200 may compare the oil level data to one or more threshold values. When the quality of the oil falls below the threshold, a message sent to the mobile device 200 may remind the user to change the oil or add oil to the engine 10. Other variations of sensors or calculations may be possible.

The fleet management system may detect a need for immediate maintenance. For example, the throttle position and the manifold pressure may generally maintain a consistent relationship when an air filter is operating properly. The controller 17 may receive throttle position data and manifold pressure data from the sensor array 11. In one example, the memory 15 includes a lookup table that relates expected values for the manifold pressure based on the throttle position and vice versa. Alternatively, the controller 17 may calculate the expected manifold pressure based on the throttle position or vice versa.

In some systems, a baseline relationship between the throttle position and the manifold pressure may be predetermined and set into the memory 13 of the machine 100 or the server 200. In these systems, this preset baseline relationship may be used to determine when the actual relationship has deviated significantly.

In other examples, the controller 17 may generate a baseline for the relationship between the throttle position and the manifold pressure (or may adjust the preset relationship). For example, when the engine is first turned on, or when the air filter is replaced, or takes an average value over a period of time (e.g., the average over the first 50 hours of operation or the last 200 hours of operation), the controller 17 collects data from the throttle position sensor and the MAP sensor. The controller 17 or the sensor 200 calculates the baseline by comparing the initial values of the throttle position data and the pressure data. The controller 17 may construct the baseline based on a predetermined function type. The function type for the relationship between the throttle position and the manifold pressure may be a linear function, a second order function, or a higher ordered function.

In either example, the controller 17 may access a lookup table that relates throttle position and manifold pressure. In some instances, the controller 17 queries the lookup table with one or more measured throttle positions and receives an expected manifold pressure. In some instances, the controller 17 queries the lookup table with one or more measured manifold pressure values and receives an expected throttle position. The controller 17 compares the expected values from the lookup table to measured values in the sensor data. When the expected values do not match (e.g., when an absolute value of a difference between measured values and expected values exceed a threshold amount), the controller 17 may generate a warning message.

Figure 3:
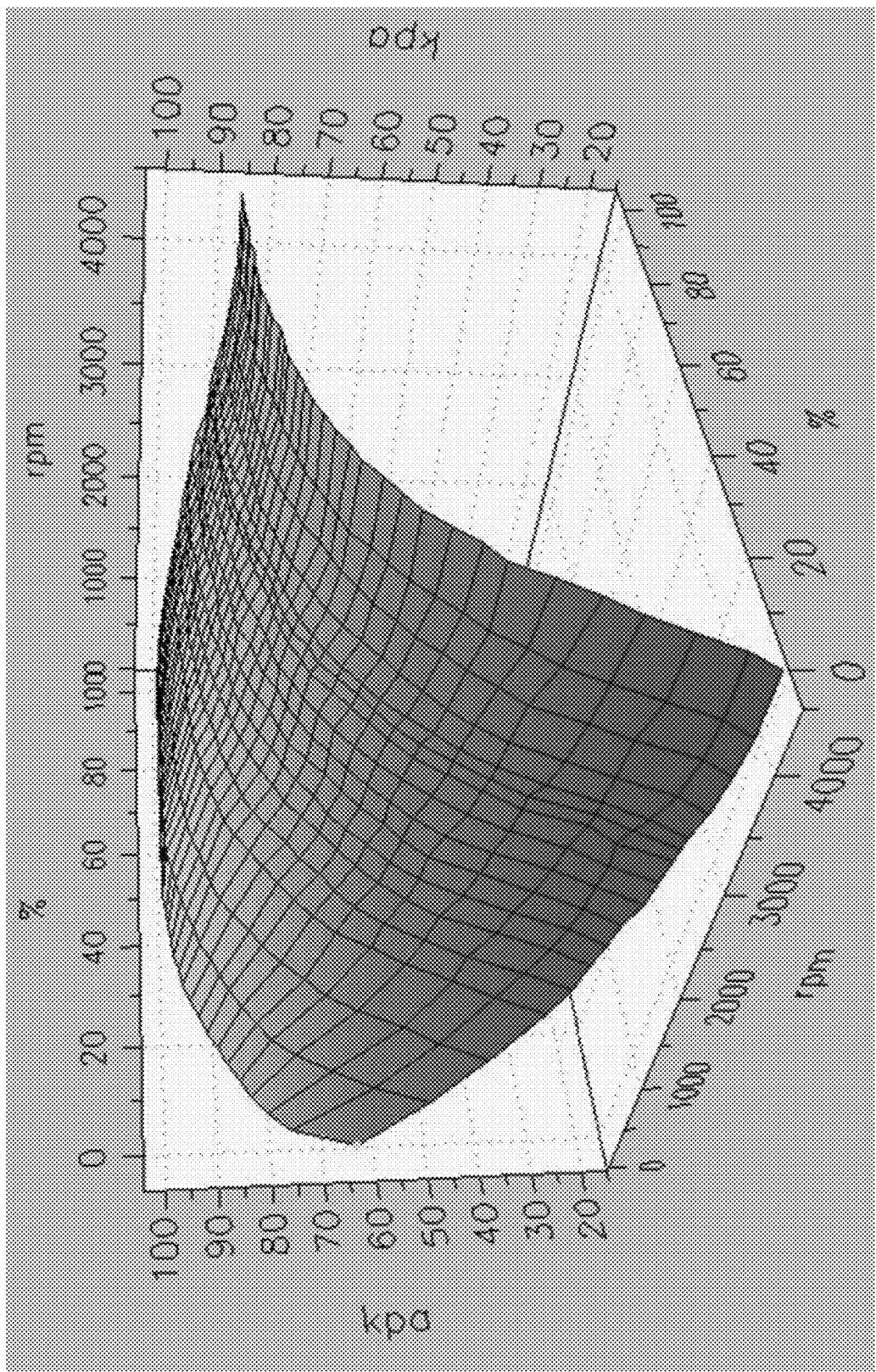
FIG. 3 illustrates one example relationship between engine speed, throttle position, and manifold pressure.

FIG. 3 illustrates one example relationship between engine speed, throttle position, and manifold pressure. The expected throttle position may be a function of manifold pressure and engine speed, and the expected manifold pressure may be a function of throttle position and engine speed. The relationship may be described by a three dimensional surface, as shown in FIG. 3, or an equation fit to the surface of FIG. 3. The relationship may be defined according to engine speed or ranges of engine speed. For example, a first relationship between throttle position and manifold pressure may be used for 0 to 1000 revolutions per minute (RPM), a second for engine speeds from 1000 to 3000 RPM, and a third for higher than 3000 RPM. The relationship between manifold pressure and throttle position may be a second order function with coefficients that vary as a function of engine speed. The relationship may vary between models of engines, manifolds, and throttles.

In one example, when the relationship between the throttle position and the manifold pressure deviates from expected values by a predetermined range (e.g., 10%, 20%, one standard deviation, or another value), the server 200 determines that maintenance is required. The relationship between the throttle position and the manifold pressure may deviate from expected values when the air filter is no longer operating properly. The air filter may be dirty or clogged, or another blockage may be near or downstream of the air filter. When the relationship between the throttle position and the manifold pressure deviates beyond a given threshold, the server 200 may generate and send a message to the mobile device 300 that instructs the user to replace the air filter for the engine 10.

The fleet management system may monitor the battery level of the engine 10. The controller 17 or the server 200 may receive battery level data from the engine 10. The battery level may be a voltage or a current. In some systems, the server 200 may make available to the mobile device 300 the battery voltage, with no further analysis. In other systems, the server 200 may compare the battery level to a minimum battery level. The minimum battery level may be stored according to battery model or device model. If the detected battery level falls below the minimum battery level, the server 200 may additionally or alternatively generate an alert message warning of low battery to the mobile device 300. The alert message may include the identifier for the engine 10. Other variations are possible.

The fleet management system may provide location based services for the engines 10. The controller 17 may receive position data from the sensor array 11, which may include GPS or another location sensor. The server 200 may generate a map that includes the locations of the engines 10. The server 200 may provide the location information and/or a generated map to the mobile device 300.

The location based service may report malfunction codes. The controller 17 (e.g., ECU) may generate malfunction codes based on the operation of the engine 10. The malfunction codes may identify a component of an error (e.g., sensor, exhaust, cylinder, manifold, or another component) and a type of error.

The server 200 may receive the malfunction code and the position data from the radio 15. The server 200 may query a malfunction code index in the memory 15 to determine whether the current malfunction code parameter is active and should be reported to the user. If the malfunction code is active and/or should be reported, the server 200 may generate a message for display on the mobile device 300 that describes the location of the engine and the type of malfunction detected by the controller 17. The message may be an email, text message, or another message that provides notification that a malfunction code is active, what the malfunction code is, and/or the location of a unit. In other systems, the malfunction code and/or location information may be provided to the mobile device 300 when a user accesses the server 200 through a website or mobile app.

In some systems, the message may also provide specific maintenance or repair instructions for display at the mobile device 300. For example, the malfunction code index stored in the memory 15 or in the server 200, may include specific instructions indexed by engine manufacturer, model number, and malfunction code. The instructions may detail the steps to check sensor functionality, change an oil filter, clean a spark plug, or another maintenance or repair procedure. The message may include a listing of the tools or parts required by the maintenance or repair. The message may include a link to purchase the tools or parts. The server 200 may automatically order the tools or parts based on the malfunction code.

The fleet management system may track the environmental impact of the fleet of engines 10. The server 200 or controller 17 may receive emission data from the gas sensors (e.g., oxygen sensor, carbon dioxide sensor, carbon monoxide, or emission sensor). The server 200 or controller 17 may calculate the total emissions of any individual machines 100 or engines 10, or the total emissions across the fleet of machines 100 and engines 10. The server 200 may generate a report for the emissions of the fleet of engines and send the report to the mobile device 300 or another type of access device 30 (e.g., a computer).

The fleet management system may track the engines 10 and the usage of the engines. For example, the server 200 may receive and store the position of the engines 10. If one of the engines is lost or stolen, the user may enter a request at or using the mobile device 300 for the last known location of the engine 10. The server 200 may access the position data and send a report to the mobile device 300. The server 200 may also provide a message when one of the engines identified as lost or stolen is subsequently turned on in the future.

The server 200 may also calculate and/or track fuel usage for the engines 10. As described above, fuel usage may be calculated, for example, based on the injection time. The amount of fuel added to the machine when fueling may additionally or alternatively be detected using a flow sensor. The user or a fleet manager may enter the amount of fuel added to the machine into an expense report (e.g., on the mobile device 300). Data indicative of the amount of fuel may be sent to the server 200.

Alternatively, the amount of fuel may be tracked from a gasoline pump. The gasoline pump may record a transaction by credit card or other purchasing information associated with the engine 10. The server 200 may receive the purchasing information, which is associated with an engine or fleet of engines.

The server 200 may compare the amount of fuel added when fueling to the amount of fuel used by the engine 10. When these two values deviate by a predetermined amount, the server 200 may generate a message for the mobile device 300 that describes a suspicion of fuel theft. The server 200 may also track when the engine 10 needs to be refueled based on a tank size, flow sensing, and/or fuel usage. Many other examples are possible.

The fleet management system may include, for example, a fleet of lawnmowers. Any of the above services may be applied to the engines of the lawnmowers. The fleet management system may provide additional or alternative features tailored to a fleet of lawnmowers.

The fleet management system may track the location of the lawnmowers. Each of the engines 10 or the lawnmowers may, for example, identify a GPS location of the lawnmower and may send the GPS location to the server 200 over a network. The server 200 may generate a map showing the locations of the lawnmowers in the fleet. Thus, the server 200 may determine when a particular lawnmower arrived at a job site, left the job site, and accordingly, the amount of time spent at the job site.

The time at the job site may be confirmed or supplemented by additional sensor data. For example, the server 200 may confirm that the ignition system indicates that the lawnmower is running and/or the deck of the lawnmower was engaged.

The fleet management system and/or server 200 may further use the location and/or timing information to track the activities of a crew. For example, a user may track a location of all engines 10 or lawnmowers in the fleet using the mobile device 300 and information stored by the server 200. In some instances, the user may identify variations in the locations of the lawnmowers and a known or anticipated work schedule. In other examples, a schedule or program may be stored in the server 200, identifying an expected location, route, or travel pattern of an engine 10 or lawnmower. In one alternative, the travel pattern of the engine 10 may be related to plowing, paving, or another mechanical device rather than a lawnmower.

The server 200 may compare the location of the engine 10 or lawnmower with an expected location, route, or travel pattern identified in the programmed schedule. Where the actual location is not within a given distance from the expected location, the server 200 may provide an alert to the mobile device 300 indicating that the lawnmower is deviating from the scheduled route or travel pattern. Additionally or alternatively, when the engine 10 or lawnmower has not moved to a new location within the timing provided in the stored location, the server 200 may provide an alert to the mobile device 300 indicating that the lawnmower (or operator) is running behind schedule. Many other variations are possible.

The server 200 may additionally or alternatively calculate the distance traveled by the lawnmower or the average speed of the lawnmower based on the position data. The server 200 may change the mow pattern for a particular location over time. For example, repeating the same mow pattern on a property may cause lines to appear in the grass or groves to form in the turn from the wheels of the lawn mower. The server 200 may adjust mowing patterns over time for the property to prevent these artifacts from forming.

The fleet management system may track an operation pattern of a mechanical device such as a mowing pattern of a lawnmower. For example, the server 200 may receive and track the GPS location of the lawnmower, which the server 200 may use to determine a travel path of the lawnmower. The server 200 may additionally identify, receive, or otherwise track when the engine of the lawnmower is turned on (such as by tracking a key position) or when a mower deck is engaged (such as by tracking a load profile of the engine). In some additional systems, the server 200 may additionally identify or receive information about a layout, boundary, or map of a turf or property to be cut. The layouts may be predefined or manually entered by the user. For example, the user may measure the lawn and enter the measurements into the mobile device 300, which are sent to the server 200. The measurements may include the boundaries of the lawn and distances to obstacles (e.g., trees, flower beds, houses, or other things that must be avoided by the lawnmower). Using some or all of the information about the travel path of the lawnmower, the property information, and when the engine is on or the deck is engaged, the server 200 may determine the mow pattern used to cut a given property.

The fleet management system, or server 200, may provide a mowing plan for the lawnmowers to a user or mobile device 300. In some systems, the server 200 may perform one or more calculations to determine the most efficient mow pattern for the turf or property to be cut. The calculations may be based on the layout, boundary, or map of the property to be cut, a location of obstacles on the property, and/or a deck width of the lawnmower. In one example, the server 200 receives the identifier from the controller 17 that indicates the width of the mowing deck of the lawnmower. The server 200 may access a lookup table associating identifiers with deck sizes. In another example, the user enters the deck size or a serial number into the mobile device 300. The server 200 may compare the deck width to the lawn layout, and to limitations presented by obstacles or narrow portions of the layout, to determine the mowing plan.

The fleet management system or server 200 may provide a mowing plan for lawnmowers to a user or mobile device 300 based on historical data. For example, the server 200 may identify or determine, and store, mow patterns for lawnmowers. The server 200 may tag or associate the stored mow patterns with a property, layout, boundary, or map of the property. In one example, the server 200 may receive a user input (e.g., from workstation 209 or mobile device 300). The user input may specify a particular pattern for the pattern. The user may walk the pattern outline and the mobile device 300 tracks the GPS position of the outline. The user may attach sensor to the mobile device 300 for surveying the pattern. The sensor may be a laser or optical range finder. In one example, the mobile device 300 may track the operation of the lawnmower or other mechanical device as it performs maintenance on the pattern (e.g., by mowing or plowing), and the tracked pattern is used for subsequent maintenance. The server 200 may additionally or alternatively tag or associate the stored mow patterns with a mower type, deck width, or other engine or lawn mower parameter.

The server 200 may additionally or alternatively store information regarding the time taken to perform the mow pattern, and/or emissions produced during the performance of the mow pattern. Once the server 200 identifies or received an indication of the property to be cut, the server 200 may reference the stored mow patterns and associated data to select the most efficient mow pattern, and provide that mow pattern as the mowing plan to the user. In some systems, such as where the property to be cut has no historical mow patterns stored, the server 200 may identify a property with a boundary, layout, or map that most closely resembles the new property, and may provide the most efficient mow pattern for the similar layout as the mowing plan for the new property. Many other variations are possible.

In addition, the server 200 may select a lawnmower based on deck widths of available lawnmower that will most efficiently mow the lawn. The deck width that evenly divides into a dimension of the lawn may be selected. Also, the server 200 may identify a pinch point (e.g., the smallest dimension of the lawn) and select a lawnmower that can fit through the pinch point. The server 200 may also determine a mowing plan that begins and ends at the same location of the lawn. In making the selection of the appropriate lawnmower, the server 200 may perform calculations based on any of the above-described parameters. Alternatively, the server 200 may consult stored mow patterns or historical mowing information in selecting an appropriate lawnmower. In one example, the deck widths of available lawnmowers are stored in the server 200. In another example, the server 200 analyzes the sensor data, as described below, to determine the deck signature, and accordingly, deck widths of the lawnmowers. In this way, job requests may be assigned to particular lawnmowers or operators based on the deck signature or load on the engine. The server 200 may distribute the jobs to various lawnmower based on past performance. In addition, the server 200 may divide an existing job to the lawnmowers on the job during the job. That is more efficient lawnmowers may be assigned more are to mow. Other variations are possible.

The fleet management system may provide maintenance reminders for the lawnmowers. Any of the maintenance or repair messages discussed above may be applied to the fleet of lawnmowers.

Figure 4:
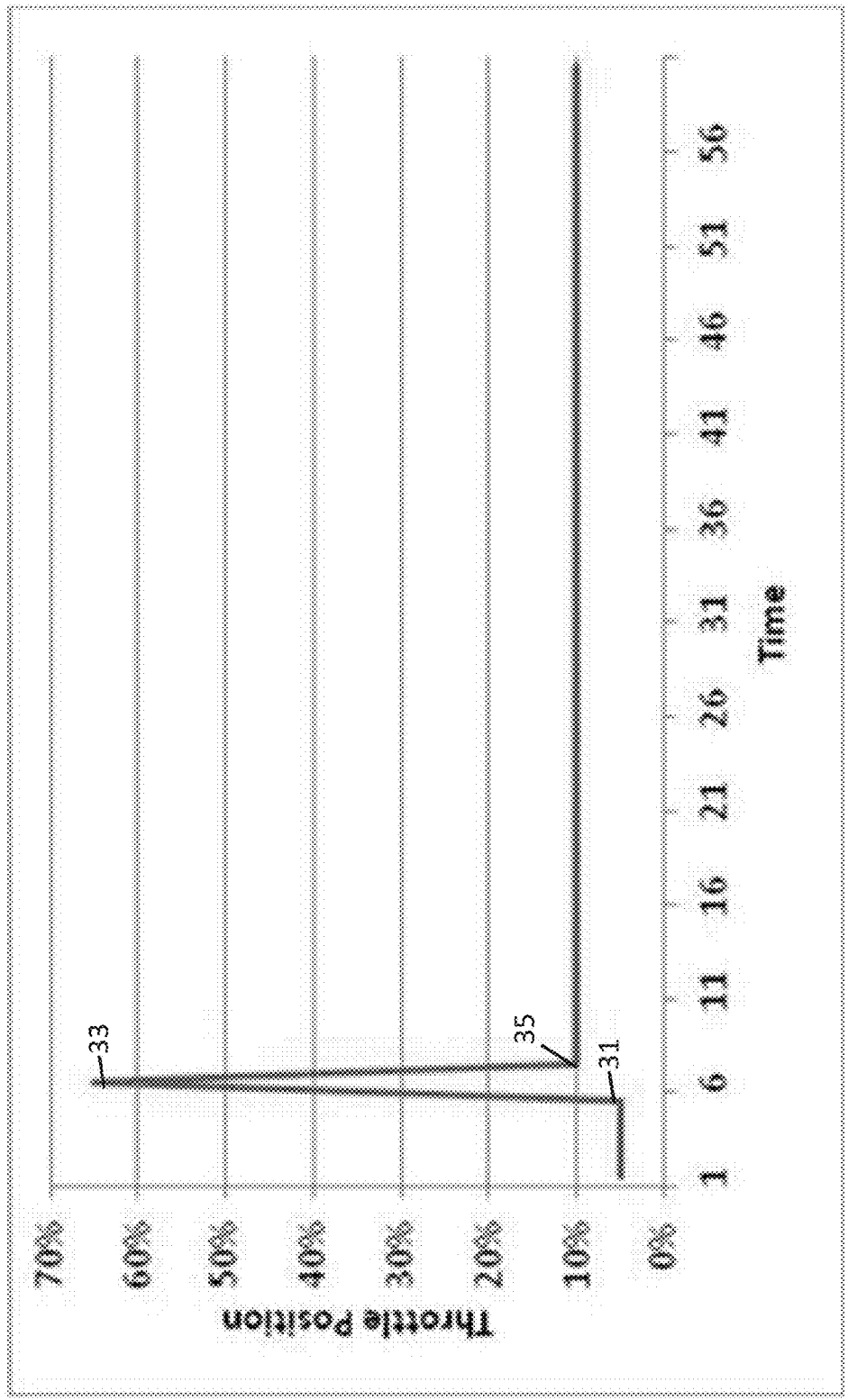
FIG. 4 illustrates an example deck signature for a lawnmower.

The fleet management system or server 200 may additionally track the deck of the lawnmower, such as when the deck is engaged or disengaged. FIG. 4 illustrates an example deck signature for a lawnmower. The graph of the deck signature includes the throttle position of the throttle valve on the vertical axis and time on the horizontal axis.

The deck signature reflects the additional load placed on the engine 10 when engaging the deck. The additional load is caused by the engaging mechanism to move the deck and/or the rotation of the lawnmower blades. Each manufacturer or model of lawnmower may have a different deck signature. The server 200 may match a measured deck signature from the sensor data to a set of possible deck signatures in order to identify the manufacturer or model of the lawnmower. The deck signature may include a starting point 31, a peak value 33, and an end point 35. The server 200 may compare throttle position data received from the engine 10 with the expected deck signature to identify when the deck is engaged.

The deck signature may be monitored by the server 200 to identify a need for maintenance. For example, when the deck signature deviates from the expected signature, the server 200 may determine that the clutch on the mower needs to be replaced or that the lawnmower blades should be replaced. In addition, the time for tracking engine run time may be started and/or stopped based on the deck signature. Additionally, the fleet management system or server 200 may use information about when the deck is engaged or disengaged for various calculations and determinations, such as for calculating a mow pattern and determining a time or emissions efficiency of the lawnmower.

The fleet management system may provide business services. For example, the deck signature may be monitored by the server 200 to identify when the lawnmower is mowing. The server 200 may determine how much mowing time was spent at the job site. The server 200 may calculate the cost of the job based on the mowing time, the price of fuel, and/or the hourly wage of employees. The server 200 may predict the cost of another job based on earlier jobs and the mowing plans (e.g., mowing distance for the job). The server 200 may calculate a bid price based on the calculated cost of the job.

The fleet management system may monitor the performance of the lawnmower or the operators of the lawnmower. The server 200 may store information about one or more operators of lawnmowers or other lawn equipment. For example, the server 200 may tag or associate historical mow pattern data or information with an operator of the lawnmower or other lawn equipment. The identification of the lawnmower or the operator may be determined from the identifier value in the data. The operator may log the lawnmower he is using via the mobile device 300. The server 200 may calculate efficiencies for particular operators or lawnmowers for specific properties or types of properties. For example, the server 200 may, based on this historical data, calculate how much area a particular operator or lawnmower covers per unit time, how efficient (time or emissions) an operator is with a particular type of engine or lawnmower, consistency of an operator in sticking to a mowing plan, time spent cutting, time spent traveling, time spent not cutting, and various other pieces of information about an operator. Using some of all of these factors, the server 200 may assign the most efficient lawnmower or operator to similar jobs in the future.

The server 200 may track improvements of operators over time. The server 200 may calculate wages or bonuses for employees based on the efficiencies. The server 200 may rank operators based on efficiency. The server 200 may assign new jobs based on past performance. The server 200 may identify types of jobs that are better suited for certain lawnmowers or certain operators. For example, empirical data may show steep inclines, narrow spaces, low clearance height, or tight corners may be better handed by certain lawnmowers or operators. The server 200 may match future job requests with those features to the more equipped lawnmower or operator. The server 200 may also divide portions of a mow pattern having specific features (e.g., steep inclines, narrow spaces, low clearance height, or tight corners) so that specific features are assigned to one lawnmower or operator and other portions are assigned to a difference lawnmower or operator.

The server 200 may monitor the lawnmowers for safety. For example, the server 200 may receive data from a tilt sensor, magnetic sensor, or accelerometer that describes the orientation of the lawnmower. The server 200 may access a maximum tilt angle based on the model of the lawnmower. The maximum tilt angle is the steepest hill that the lawnmower can mow or travel on safely. The server 200 may compare the maximum tilt angle to the current title angle of the lawnmower. If the current angle of the lawnmower exceeds the maximum tilt angle, the server 200 may generate a tilt warning message, which is sent to the mobile device 300.

The fleet management system may include a fleet of welding machines, such as welder/generators. Any of the above services may be applied to the engines of the welding machines. The fleet management system may provide additional features tailored to a fleet of welding machines or a single welding machine.

Based on the injection time data, the controller 17 or the server 200 may calculate the amount of fuel used by the welding machine. Similarly, the ratio of time between when the machine is welding or not welding may be calculated. The server 200 may identify when the welding machine is approaching time for refueling based on fuel usage. Many other variations are possible.

The fleet management systems described herein may include one or more generators, such as one or more portable generators, towable generators, residential or industrial generators, marine generators, or other generators. As an example, the fleet management system may include a set of marine generators aboard a fleet of fishing boats, cruise boats or ships, military or police ships, or other set of sea vessels. As another example, the fleet management system may include a set of towable generators, such as a set of towable generators owned by one or more towable generator rental companies. As still another example, the fleet management system may include a set of industrial generators used at a series of commonly owned buildings or plants. Many other variations are possible.

The fleet management systems including generators ("generator fleet management system") may include one or a plurality of generators, which may include an engine (such as engine 10) and an alternator. The fleet management systems including generators may additionally include a management device 20 or server 200. The generators may communicate with the management device 20 or server 200 through a wired or wireless network. The fleet management systems including generators may additionally or alternatively include one or more access devices 30, such as a mobile device 300, which may access information from the management device 20 or server 200 about the fleet of generators. Additional, different, or fewer components may also be included.

The generator fleet management system may identify, receive, track, and/or otherwise collect information about the generators from the generators or engines 10 in the generators, including any of the information described above. As some examples, the generator fleet management system may identify, receive, track, and/or otherwise collect information about usage or operation of the engine, such as when the engine is on, what speed the engine is operating at, a load being supplied power by the generator, a temperature of the engine, a mode of operation of the engine (such as a power-supply mode or an exercise mode), and any other engine operating parameters. As additional examples, the generator fleet management system may identify, receive, track, and/or otherwise collect information about the location of the generator, fuel consumption or usage of the generator, whether or not additional generators are paralleled with the generator, a wiring configuration of the generator, a power quality or power signal generated by the generator, or various other parameters. The generator fleet management system may additionally or alternatively identify, receive, track, and/or otherwise collect information related to the generator information, such weather information for the location of the generator. Many other variations are possible.

The generator fleet management system or a component thereof (such as the server 200, or in some instances the generators themselves) may perform one or more calculations based on the information identified, received, tracked, and/or otherwise collected. The generator fleet management system, or server 200, may provide information, messages, reports, or alerts about the generators to a user through the access device 30 or mobile device 300. In some instances, the user may access the information from the server 200 through a website or mobile app. In other instances, the server 200 may send notifications to the user through messages or alerts transmitted to the access device 30 or mobile device 300. The server 200 may provide the information, messages, reports, or alerts regularly, continuously, at intervals, when triggered, or at random.

For example, the server 200 may provide a report on the status of the identify an efficiency of a generator, a fuel consumption or usage of a generator, a condition of the components (such as a condition of an air filter or component of the generator) to an access device 30 or a mobile device 300.

As another example, the server 200 may identify and track a location of the generators (such as where the generators are marine generators on a fleet of ships or towable generators rented by a rental company). The server 200 may provide a regular or map report of the locations to a user or fleet manager, such as through an access device 30 or a mobile device 300. In some systems, the server 200 may compare a location, route, or travel path of a generator with an expected location, route, or travel path of the generator. Where the actual location, route, or travel path differs from the expected location, route or travel path by more than a threshold amount, the server 200 may transmit an alert to the fleet manager, indicating that the generator is not following an expected course or is not in an expected location. In this way, a fleet manager may monitor the usage of marine or rental property, and may further find lost or stolen property.

As another example, the server 200 may monitor the operating parameters of a set of residential or industrial generators installed by a particular distributor or dealer. The server 200 may provide the owner, or the distributor or dealer, with alerts when one or more parameters indicate a potential part failure. As such, the owner may take corrective action, or the distributor or dealer may contact the owner of the generator and suggest corrective action, in accordance with the alerts. Many other variations are possible.

Figure 5:
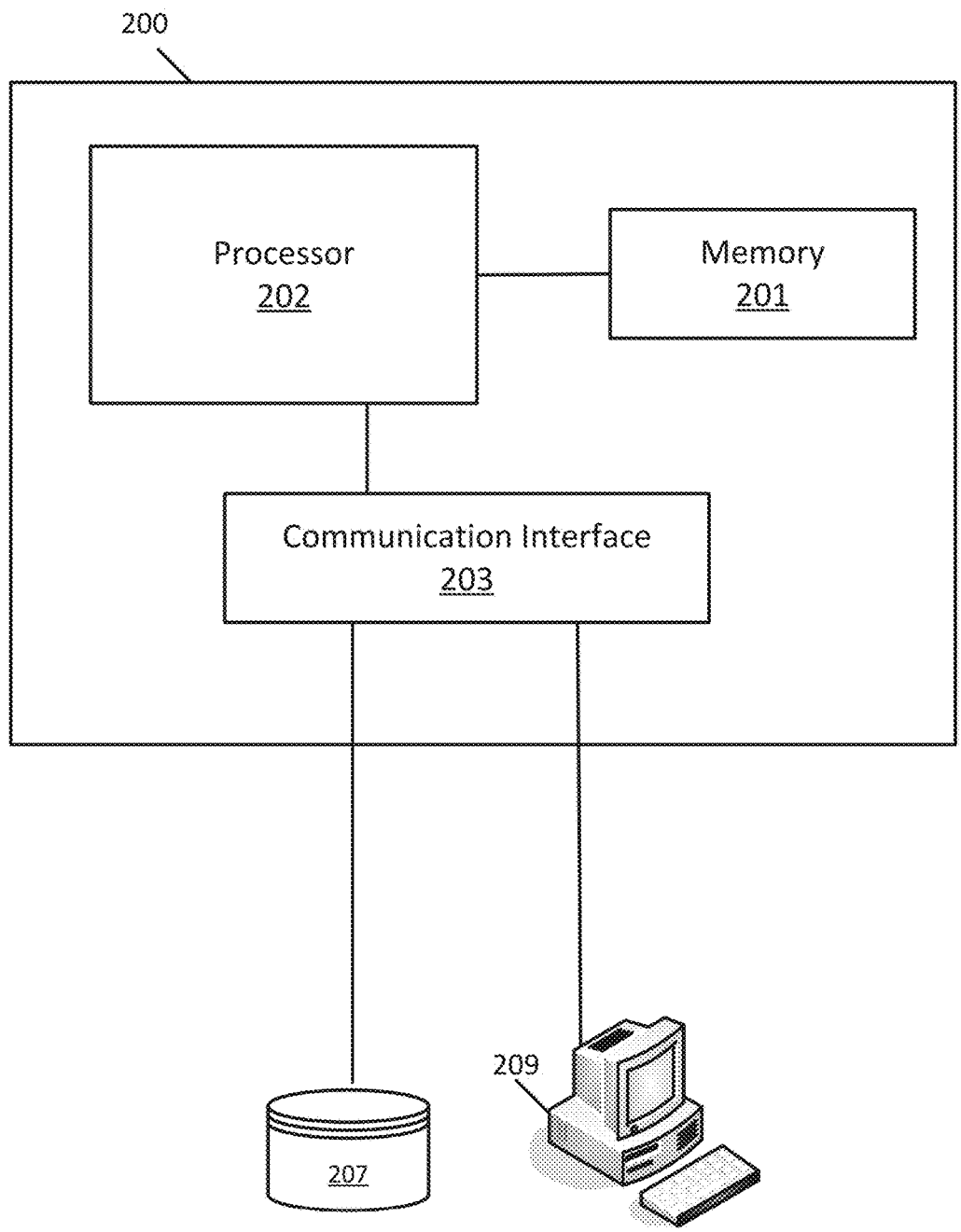
FIG. 5 illustrates an example server.

FIG. 5 illustrates an example server 200. The server 200 includes at least a processor 202, a memory 201, and a communication interface 203. The server 200 may be coupled with a database 207 and/or a workstation 209. The database 207 may store possible load signatures associated with various mechanical devices. The database 207 may store management functions, maintenance intervals, and example message described herein. The user may provide input through the workstation 209 to modify or create the management functions, maintenance intervals, or messages. Additional, fewer, or different components or arrangements are possible. The examples above described as functions of the server 200 may be performed by the processor 202, memory 201, and the communication interface 203. Any of the functions or calculations described above with respect to the server 200 may alternatively be performed by the access device 20 or internally to the machine (e.g., by controller 17).

Figure 6:
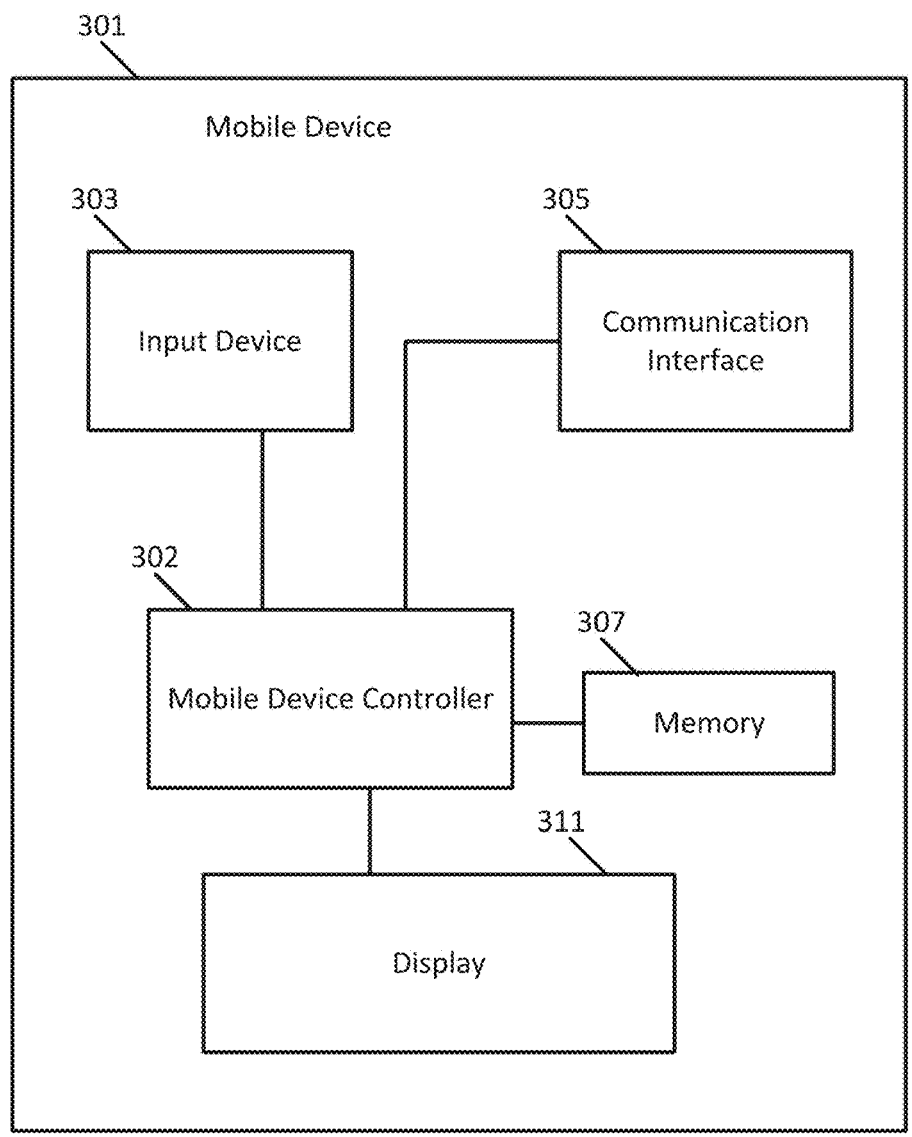
FIG. 6 illustrates an example mobile device.

FIG. 6 illustrates a mobile device 300 for receiving user inputs and displaying fleet management messages and reports. The mobile device 300 includes a mobile device controller 302, an input device 303, a communication interface 305, a memory 307, and a display 311. Additional, different, or fewer components may be included.

The examples above describe an alert sent to the mobile device 300. In other instances, this information may be (1) accessed by a user of the mobile device 300 through a log-in to a website, service, or a mobile application, and/or (2) may be sent back to the machine including the engine 10 in some instances in which the machine includes or is otherwise in communication with an on-board display).

Figure 7:
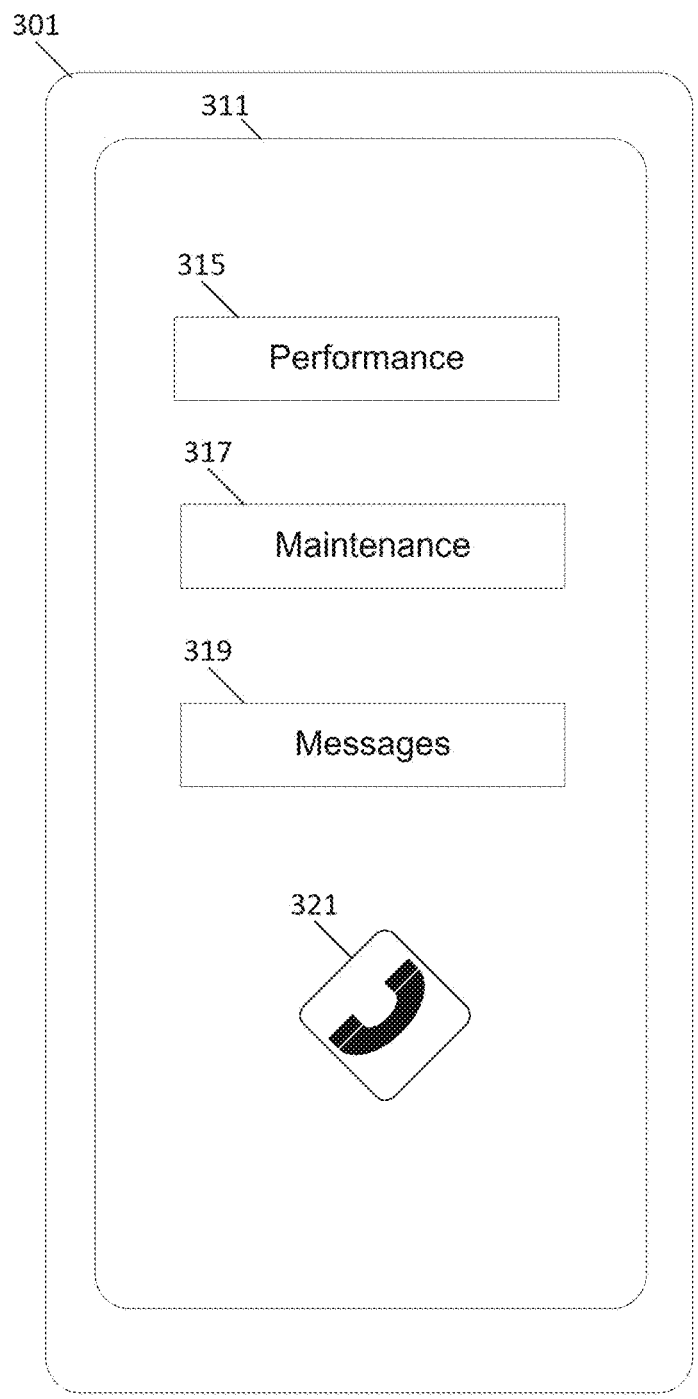
FIG. 7 illustrates an example application for the mobile device.

FIG. 7 illustrates an example application running on display 311 for fleet management services. The mobile application may include a performance button 315 to enter a performance monitoring section of the mobile application, a maintenance button 317 to enter a maintenance section of the mobile application, a messages button 319 to enter a mailbox, and a phone button 321. The phone button may be linked to a phone number or email for a manger or other employee for the fleet.

Figure 8:
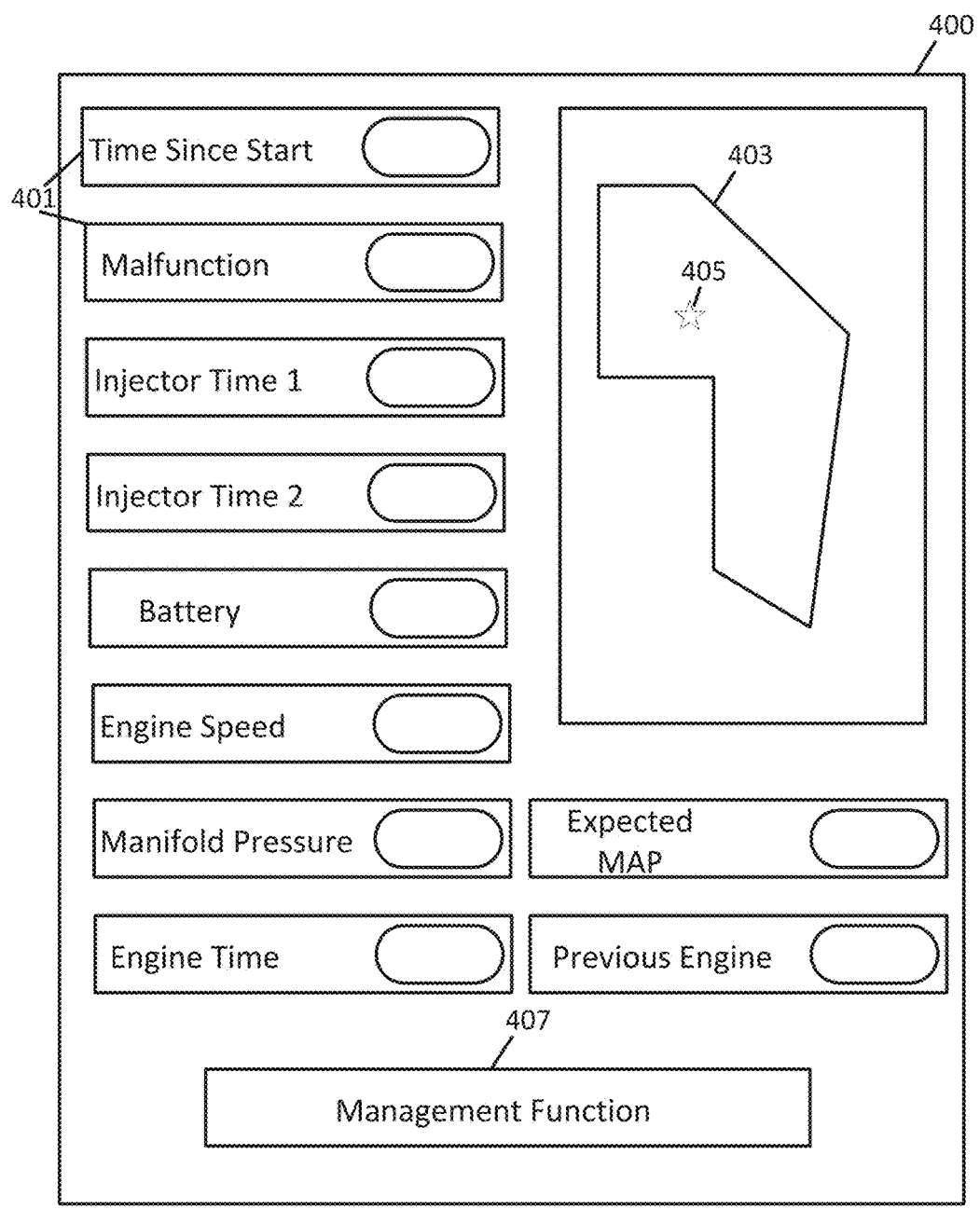
FIG. 8 illustrates another example application for the mobile device.

FIG. 8 illustrates an example application for the fleet management system. The application may display the sensor data, maintenance intervals, or management functions to the user. The example screenshot 400 may include sensor data readouts 401 such as timer values, malfunction, injection times, battery levels, engine speeds, manifold pressure, engine time, or other data. The example screenshot 400 may compare the expected manifold pressure to the measured manifold pressure. The example screenshot 400 may compare the expected throttle position to the measured throttle position. The example screenshot 400 may include a map 403 of a mowing pattern. The map 403 may also include a current position 405 of the engine based on GPS or another positioning technique. In addition, the application may include an indication of a mode of the fleet device. Example modes include closed loop mode (e.g., fuel efficient mode) or an open loop mode (e.g., power enhancement mode).

Figure 9:
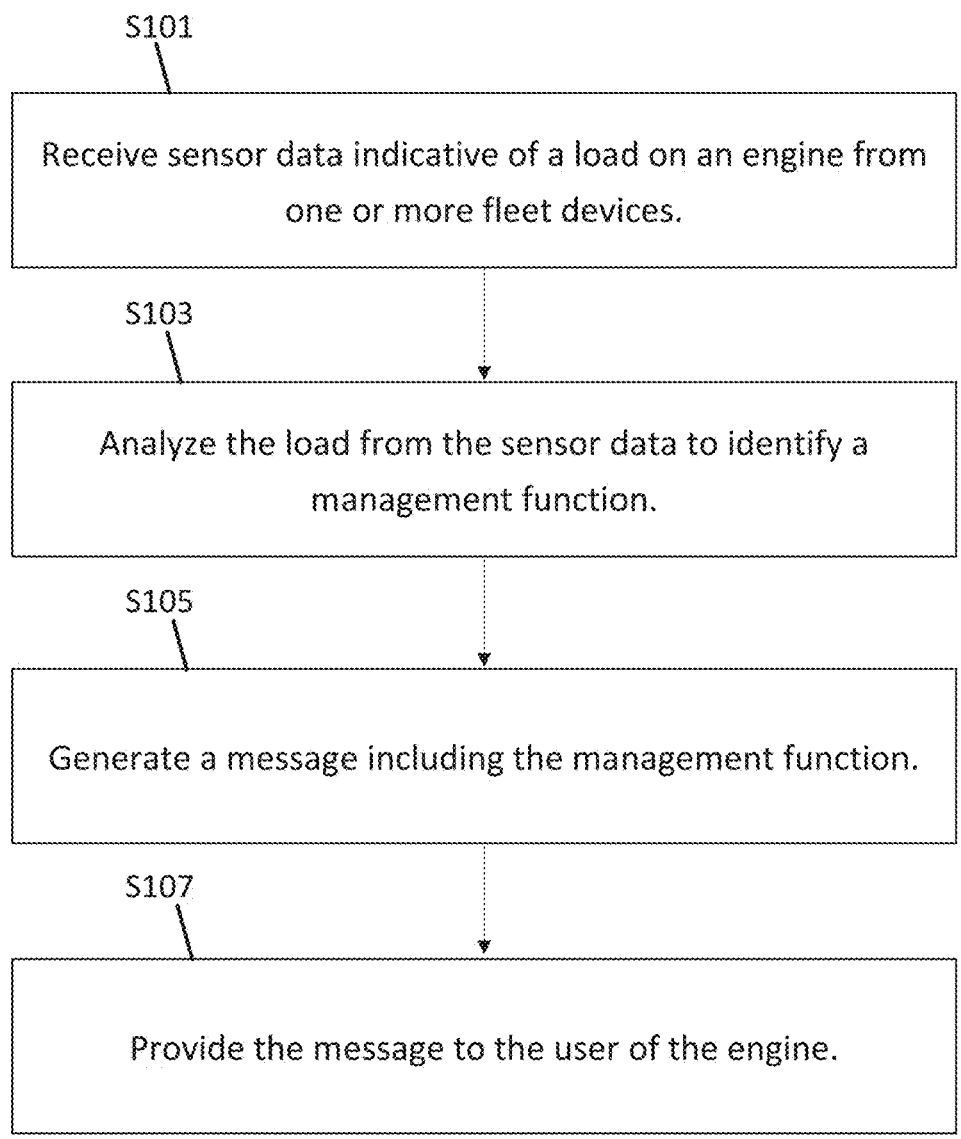
FIG. 9 illustrates an example flow chart for the fleet management system.

FIG. 9 illustrates a flow chart for the fleet management system. The acts of FIG. 8 may be performed by the mobile deice 300, the server 200 or on the machine 100 (e.g., by controller 17), which may be referred to alternatively as a computing device. Additional, different, or fewer acts may be included.

At act S101, the computing device may receive sensor data indicative of a load on an engine from one or more fleet devices. The sensor data may be received by the controller 17 from one or more of the sensors. The sensor data may be received at the server from the controller 17 or an engine control unit (ECU). The sensor data may be accumulated to describe aggregate use of the engine. The sensor data may indicate the operation of an intermittent mechanical device that is connected and disconnected to the engine. Examples include a lawnmower deck, a plow, a chainsaw, a pump, a welder, or other devices. Thus, the sensor data may include a load signature, which may be a lawnmower deck signature, or alternatively, a load signature for a plow, chainsaw, welder or other device.

At act S103, the computing device may analyze the load from the sensor data to identify a management function. In one example, the management function describes a maintenance interval or maintenance instruction. For example, the computing device may identify when a mower blade, engine oil, filter, or another consumable related to the engine should be replaced. In another example, the management function may assign a job request to the engine. For example, the computing device may identify a model or capability associated with the engine (e.g., deck width, chainsaw blade size, or another capability of the mechanical device associated with the engine).

In one example, the computing device may analyze the load from the server data to identify incorrect operation of the engine. For example, in the case of a lawnmower, the sensor data may include a load signature indicative of hitting an obstruction. The obstruction may prevent the lawnmower blade from properly turning, or damage the lawnmower such as creating misalignment of the mowing deck, which places a high load on the engine. The indication of incorrect operation may be sent to the management device. The management function may indicate that the incorrect operation has occurred, suggest maintenance based on the incorrect operation, or provide operating techniques that may help avoid the incorrect operation.

At act S105, the computing device may generate a message including the management function. The message may include an instruction to the user to perform maintenance. The message may give the user an option of requesting service.

Any combination of the controller 17, processor 202, and the mobile device controller 302 may include a general processor, digital signal processor, an application specific integrated circuit (ASIC), field programmable gate array (FPGA), analog circuit, digital circuit, combinations thereof, or other now known or later developed processor. One or more of the processor 202, the generator controller 130, and the mobile device controller 302 may be a single device or combinations of devices, such as associated with a network, distributed processing, or cloud computing.

The memory 15, memory 201 and memory 307 may be a volatile memory or a non-volatile memory. The memories may include one or more of a read only memory (ROM), random access memory (RAM), a flash memory, an electronic erasable program read only memory (EEPROM), or other type of memory. The memory 201 may be removable from the controller 302, and the memory 15 may be removable from the engine, such as a secure digital (SD) memory card.

The communication interface 203 and the communication interface 305 may include any operable connection. An operable connection may be one in which signals, physical communications, and/or logical communications may be sent and/or received. An operable connection may include a physical interface, an electrical interface, and/or a data interface. The communication interface 203 and the communication interface 305 provides for wireless and/or wired communications in any now known or later developed format.

The engines 10, the server 200, and the mobile device 300 are connected by a network. The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The memories may be a non-transitory computer-readable medium. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising: receiving sensor data from a position sensor or a pressure sensor mounted in a manifold of at least one engine to collect data for a throttle valve of the at least one engine, the sensor data indicative of a bad on the at least one engine from one or more fleet devices, wherein the sensor data describes a throttle position of the at least one engine, wherein the load includes a mechanical device connected to the at least one engine; comparing the sensor data to a load signature; starting a timer when the sensor data matches the load signature; determining a management function based on the timer; and generating a message including the management function.

2. The method of claim 1, wherein the sensor data includes throttle position data and manifold pressure data.

3. The method of claim 2, further comprising:
accessing an expected value for manifold pressure according to the throttle position data;
comparing the manifold pressure data to the expected value for manifold pressure; and
generating a warning message for the management function when the manifold pressure data exceeds the expected value by a threshold amount.

4. The method of claim 1, further comprising:
calculating a maintenance interval for the management function.

5. The method of claim 1, wherein the mechanical device is a lawnmower deck.

6. The method of claim 1, wherein the load signature describes a model of a lawnmower, a welder, a pump, or a plow.

7. The method of claim 1, further comprising:
identifying oil data indicative of a state of the oil of the at least one engine, wherein the management function includes a maintenance interval calculated as a function of the oil data, wherein the state of the oil includes an oil quality, an oil level, or both.

8. A method comprising:
receiving sensor data from an engine control unit electrically connected to one or more fuel injectors of an engine, the sensor data indicative of a load on the engine of one or more fleet devices;
analyzing, using a processor, the load from the sensor data to identify a management function;
calculating a maintenance interval for the management function, wherein the sensor data includes injection time data indicative of an operation of one or more fuel injectors of the engine and the maintenance interval is calculated as a function of the injection time data; and
generating, using the processor, a message including the management function.

9. The method of claim 8, further comprising:
identifying oil data indicative of a state of the oil of the engine, wherein maintenance interval is calculated as a function of the oil data, wherein the state of the oil includes an oil quality, an oil level, or both.

10. The method of claim 8, wherein the sensor data is indicative of a mechanical device connected to the engine.

11. The method of claim 10, wherein the mechanical device is a lawnmower deck.

12. A method comprising:
receiving sensor data indicative of a load on an engine from one or more lawnmowers, wherein the sensor data indicates throttle position of the engine;
analyzing, using a processor, the load from the sensor data to identify a management function;
performing a comparison of the sensor data to a set of load signatures;
selecting a lawnmower type based on the comparison; and
generating, using the processor, a message including the management function according to the lawnmower type.

13. The method of claim 12, further comprising:
assigning a job request based on a deck size of the selected lawnmower type.

14. The method of claim 12, further comprising:
determining a mowing pattern based on a deck size of the selected lawnmower type.

15. An apparatus comprising:
a memory including a plurality of management functions for one or more fleet devices; and
a processor configured to analyze sensor data indicative of a load on an engine of the one or more fleet devices and generate a message including a management function selected from the memory based on the load of the engine, wherein the sensor data indicates throttle position of the engine, and the sensor data is indicative of a lawnmower deck connected to the engine, wherein the processor is configured to compare the sensor data to a load signature and start a timer when the sensor data matches the load signature, wherein the management function is based on the timer.

16. The apparatus of claim 15, wherein the sensor data includes throttle position data and manifold pressure data, and the processor is configured to access an expected value based on the sensor data and generate a warning message when the sensor data is inconsistent with the expected value.

17. The apparatus of claim 15, wherein the processor is configured to compare the sensor data to a set of load signatures and select a lawnmower based on the comparison.

18. An apparatus comprising:

an engine mechanically connected to a mechanical device;

a sensor mounted on the engine and configured to collect sensor data indicative of a throttle position of the engine and indicative of a load on the engine based, at least in part, to the mechanical device connected to the engine;

a processor configured to provide a management function for the engine based on a received analysis of the sensor data including a comparison of the sensor data to a load signature and a timer based on the comparison, wherein a message including the management function is provided to a user of the engine.

19. The apparatus of claim 18, wherein the mechanical device is a lawnmower deck.

* * * * *

UNITED STATES PATENT AND TRADEMARK OFFICE
CERTIFICATE OF CORRECTION

PATENT NO. : 10,060,827 B2
APPLICATION NO. : 14/586323
DATED : August 28, 2018
INVENTOR(S) : William Schnell et al.

Page 1 of 1

It is certified that error appears in the above-identified patent and that said Letters Patent is hereby corrected as shown below:

In the Claims

Claim 1, Column 19, Line 54. Please replace "bad" with -- load --.

Signed and Sealed this
Second Day of April, 2019

Andrei Iancu
*Director of the United States Patent and Trademark Office*